(12) United States Patent
Minowa

(10) Patent No.: US 7,689,461 B2
(45) Date of Patent: Mar. 30, 2010

(54) PRINTING APPARATUS, POS SYSTEM AND PRINTING APPARATUS CONTROL METHOD

(75) Inventor: Masahiro Minowa, Hatamachi (JP)

(73) Assignee: Seiko Epson Corporation (JP)

( * ) Notice: Subject to any disclaimer, the term of this patent is extended or adjusted under 35 U.S.C. 154(b) by 1344 days.

(21) Appl. No.: 11/138,794

(22) Filed: May 25, 2005

(65) Prior Publication Data

US 2005/0271446 A1 Dec. 8, 2005

(30) Foreign Application Priority Data

May 25, 2004 (JP) ............................. 2004-154636

(51) Int. Cl.
 G07G 1/12 (2006.01)
 G06F 15/16 (2006.01)
 G06F 17/00 (2006.01)
(52) U.S. Cl. .................... 705/24; 709/229; 235/375
(58) Field of Classification Search ................ 709/229; 235/375
 See application file for complete search history.

(56) References Cited

U.S. PATENT DOCUMENTS

| 5,066,152 | A | 11/1991 | Kuzuya et al. |
| 7,014,110 | B2 | 3/2006 | Minowa et al. |
| 7,156,304 | B2 | 1/2007 | Minowa et al. |
| 2001/0032266 | A1* | 10/2001 | Minowa ..................... 709/229 |
| 2002/0046082 | A1 | 4/2002 | White |
| 2002/0113120 | A1* | 8/2002 | Yajima ....................... 235/375 |

FOREIGN PATENT DOCUMENTS

| CN | 1469259 A | 1/2004 |
| DE | 3324501 A1 | 1/1985 |
| DE | 195 29 505 A1 | 2/1996 |
| DE | 201 04 113 U 1 | 8/2002 |

(Continued)

OTHER PUBLICATIONS

Application #05010622.8-2211-Reference A5/61035 EP(European Search Report) dated Dec. 19, 2006.

Primary Examiner—F. Zeender
Assistant Examiner—Denisse Ortiz Roman
(74) Attorney, Agent, or Firm—Baker & Hostetler, LLP

(57) ABSTRACT

A printing apparatus and method for printing receipts and for controlling the cutting of each receipt in succession from a recording medium such as print paper at an appropriate position determined from the print data received from a host computer. The printing apparatus 50 prints first print data representing transaction information with a paper cut command appended thereto and second print data representing additional information from print data received from a host computer 40. A first control unit 521 prints the first print data and delays executing the paper cut command added to the first print data when first print data is received from the host computer. When print data is received while execution of the paper cut command is delayed, a print data detection unit 522 determines the type of print data received based on the presence or absence of an identifier in the received print data. If the received print data is recognized as second print data, a second control unit 523 prints the received second print data and then executes the paper cut command. If the received print data is determined not to be second print data, the second control unit 523 executes the paper cut command before printing the received print data.

10 Claims, 10 Drawing Sheets

FOREIGN PATENT DOCUMENTS

| | | |
|---|---|---|
| EP | 0 416507 A2 | 9/1990 |
| FR | 2 607 610 | 11/1986 |
| GB | 2 159 771 A | 6/1983 |
| JP | 08-315252 | 11/1996 |
| JP | 11-353553 | 12/1999 |
| JP | 2002-307765 | 10/2002 |
| JP | 2003-500767 | 1/2003 |
| JP | 2003-251595 | 9/2003 |

* cited by examiner

PRINTING APPARATUS, POS SYSTEM AND PRINTING APPARATUS CONTROL METHOD

BACKGROUND OF THE INVENTION

1. Field of Technology

The present invention relates to a printing apparatus for printing a receipt to print paper and cutting the receipt from the print paper in response to print data received from a computer with the print data including transaction information print data generated e.g. by a POS (point-of-sale) application running on a host computer with a paper cut command contained in the print data, and additional information print data that is added to the transaction information print data, and relates further to a POS system and a control method.0

2. Description of Related Art

Additional information, e.g. advertising information such as product advertisements and event announcements, is commonly added to and printed in addition to transaction information relating to purchased products and their purchase price information on customer receipts in supermarkets and other retailers as well as in fast food stores and other restaurants. A POS system is generally used for generating such print data and printing such receipts. This additional information is not limited to advertising information. More recent systems can also print sales promotion information such as coupons and lottery tickets, and the printed receipts are therefore also effective as a sales promotion means for product manufacturers and retailers. Hence, "additional information", as the term is used herein, means any information other than the transaction information that may be printed on a receipt.

Such POS systems typically have a plurality of POS terminal computers connected to a central POS server, and an information-provider server for providing the additional information. The POS terminal computers (host computers) generate the transaction information and have access to a product master, which is a product information database. To process a transaction, the POS terminal computer sends the input data (product codes) acquired by scanning the barcodes on the products purchased by the customer to the POS server. The POS server retrieves and returns the product name, price, and other product information relating to the input data from the product master stored on the POS server to the POS terminal computer. The POS terminal computer then uses this product information to generate the transaction information. The POS terminal computer also sends the input data to the information-provider server to extract and generate the additional information related to the input data from the information-provider server. The POS terminal computer then merges the transaction information and additional information to produce the print data, and sends the print data to an attached printing apparatus to print a receipt containing the additional information. See, for example, FIG. 2 of Japanese Published Patent Application 2003-500767(A).

The operating system (OS) in most POS terminal computers used in retail stores and restaurants as described above is still a disk operating system (DOS). With a DOS, the POS application typically sends print data and print commands directly to the printing apparatus without going through a printer driver. This means that in order to add new functionality, such as printing additional information on receipts, to the POS system, the POS application itself must be modified. Especially, for the DOS, modifying the POS application itself is a complicated and expensive process. POS system users (businesses) therefore strongly desire to be able to add new functions to existing POS systems with little or no modification of the POS application itself.

The present invention solves the foregoing problem by providing a printing apparatus capable of efficiently printing a receipt in response to print data received from a host computer running on a POS application with the print data including first print data representing transaction information and second print data representing additional information and then cutting the receipt at an appropriate position determined by the print data, without changing the POS application.

SUMMARY

The printing apparatus according to the present invention prints a receipt based on print data containing transaction information print data generated by a POS application running on a host computer, and additional information print data that is print data added to the transaction information print data and has an identifier added thereto, and is composed of a transportation unit for conveying the receipt; a printing unit for printing the receipt synchronized to receipt transportation; a cutter unit for cutting the trailing end of the printed receipt based on a paper cut command added to the transaction information print data; a first control unit for controlling the transportation unit and printing unit to print the transaction information print data and delay execution of the paper cut command added to the transaction information print data when transaction information print data is received from the host computer; a print data evaluation unit for determining if print data received while execution of the paper cut command is delayed is additional information print data based on whether the identifier is detected in the received print data; and a second control unit for controlling the transportation unit, printing unit, and cutter unit to print the additional information print data and then execute the paper cut command when the received print data is determined to be additional information print data, and to cancel the delay and execute the paper cut command before printing the received print data when the received print data is determined to not be additional information print data.

The POS system of this invention includes a printing apparatus as described above and a host computer for printing to the printing apparatus. The host computer in this POS system has a transaction information print data output unit for sending transaction information print data with an added paper cut command generated by the POS application to the printing apparatus; an additional information print data selection unit for determining based on analyzing the transaction information print data whether to generate additional information print data; and an additional information print data output unit for generating and outputting the additional information print data with the identifier added thereto to the printing apparatus when the additional information print data selection unit determines that additional information print data is to be generated.

A method for controlling a printing apparatus according to the present invention has a step of printing a receipt based on print data containing transaction information print data generated by a POS application running on a host computer, and additional information print data that is print data added to the transaction information print data and has an identifier added thereto. This printing apparatus control method also has a step of printing the transaction information print data and delaying execution of the paper cut command added to the transaction information print data when transaction information print data is received from the host computer; a step of determining if print data received while execution of the paper cut command is delayed (saved) is additional information print data based on whether the identifier is detected in the received print data; a step of printing the additional information print data and then executing the paper cut command and canceling the saving paper cut command when the received print data is determined to be additional information print data; and a step of executing the paper cut command and canceling the saving paper cut command before printing the received print data when the received print data is determined to not be additional information print data.

When the printing apparatus receives print data other than transaction information print data produced by the POS application and additional information print data appended to the transaction information print data, the printing apparatus determines whether data received while the paper cut command appended to the transaction information print data is saved and command execution is delayed is the additional information print data based on whether an identifier is detected in the received print data. More specifically, the printing apparatus determines if data received while the paper cut command is delayed is print data to be printed on the same receipt as the received transaction information print data. If the received print data is not the additional information print data, the paper cut command is executed before the received print data is printed. A receipt that is cut at the appropriate position can thus be printed and issued.

Furthermore, because the printing apparatus controls printer operation according to the received print data, a print function for printing data other than the transaction information print data and additional information print data can be added to the host computer by loading an appropriate utility, and modifying the POS application is therefore not necessary.

Furthermore, the additional information print data is generated and sent to the printing apparatus as a result of analyzing the transaction information print data. Depending upon the content of the transaction information print data, therefore, additional information print data is not always sent to the printing apparatus after the transaction information print data. The printing apparatus still determines the type of print data received even when additional information print data is not supplied (such as when the next transaction information print data is sent while the paper cut command is delayed) and executes the paper cut command before printing the received print data. A receipt containing only the transaction information print data can thus be printed and issued in this situation.

To make the receipt printing process more efficient, the header print data (typically a logo containing the store name, address, and a graphic, other than the transaction information print data and additional information print data) printed at the leading end of the next receipt before the transaction information print data is generally printed to the top of the next receipt before the transaction information print data is received. When the header print data is sent from the host computer while the paper cut command is delayed, the printing apparatus can determine that the received print data is not additional information print data by reading an identifier (such an identifier generally not contained in print data such as the header print data). The paper cut command can thus be executed before the print data is printed, and the receipt can be appropriately cut between the transaction information print data and header print data.

When a paper cut command is not delayed (saved) and neither the identifier nor the paper cut command is contained in the received print data (such as when header print data is received), the print data is preferably simply printed and the paper cut command not executed. Thus arranged, the receipt can still be printed at the appropriate position (between the additional information print data and header print data) even when the print data is sent in the order transaction information print data, additional information print data, and header print data.

Furthermore, when the paper cut command is not delayed but the identifier is contained in the received print data (when additional information print data sent at any time other than immediately following the transaction information print data is received), the paper cut command is preferably executed after printing the print data. When multiple units of additional information print data are output consecutively to the printing apparatus, this arrangement enables individually cutting and issuing the second and subsequent units of additional information print data.

Roll paper or some other kind of endless recording medium is typically used for printing receipts with each printed receipt cut-off in succession from the roll paper after having been printed. The paper cut command as used herein identifies a command causing the printing apparatus to cut the recording medium off of the roll paper at the trailing end of a printed receipt.

The printing apparatus preferably includes a delay time counter for measuring the delay time of the paper cut command; and a third control unit for canceling the delay and controlling the paper cutter unit to execute the paper cut command when the delay time exceeds a specified time.

The printing apparatus executes the paper cut command when a specified time has passed after the transaction information print data is received and execution of the paper cut command is delayed. Therefore, if the print data sent from the host computer is only transaction information print data and additional information print data (such as when print data such as the header print data is not sent from the host computer), for example, the trailing end of the receipt can be automatically cut even when additional information print data is not sent because of the content of the transaction information. In other words, because additional information print data or header print data is not sent after the transaction information print data is received, executing the paper cut command does not need to wait until the next transaction information print data is received.

The printing apparatus according to another embodiment of this invention prints a receipt based on print data containing transaction information print data generated by a POS application running on a host computer, additional information print data that is print data added to the transaction information print data and has an identifier added thereto, and header print data, and then prints header print data for the next receipt before cutting the trailing end of the printed receipt. This printing apparatus has a transportation unit for conveying the receipt; a printing unit for printing the receipt synchronized to receipt transportation; a cutter unit for cutting the printed receipt based on a paper cut command added to the transaction information print data; a first control unit for controlling the transportation unit and printing unit to print the transaction information print data and delay execution of the paper cut command added to the transaction information print data when transaction information print data is received from the host computer; a print data evaluation unit for determining if print data received while execution of the paper cut command is delayed is additional information print data or header print data based on whether the identifier is contained in the received print data; and a second control unit for controlling the transportation unit, printing unit, and cutter unit to print the header print data and then execute the paper cut command when the received print data is determined to be header print data.

A POS system according to a further embodiment of the invention has a printing apparatus as described above and a host computer for printing to the printing apparatus. The host computer in this POS system has a header print data output unit for sending the header print data to the printing apparatus; a transaction information print data output unit for sending transaction information print data with an added paper cut command generated by the POS application to the printing apparatus; an additional information print data selection unit for determining based on analyzing the transaction information print data whether to generate additional information print data; and an additional information print data output unit for generating and outputting the additional information print data with the identifier added thereto to the printing apparatus when the additional information print data selection unit determines that additional information print data is to be generated.

In an embodiment of the method of the present invention for controlling a printing apparatus that prints a receipt based on print data containing transaction information print data generated by a POS application running on a host computer, additional information print data that is print data added to the transaction information print data and has an identifier added thereto, and header print data, the header print data is printed on the next receipt before cutting the trailing end of the previously printed receipt. Another embodiment of the method of the present invention has a step of printing the transaction information print data and delaying execution of the paper cut command added to the transaction information print data when transaction information print data is received from the host computer; a step of determining if print data received while execution of the paper cut command is delayed is header print data or additional information print data based on whether the identifier is detected in the received print data; and a step of executing the paper cut command after printing the header print data when the received print data is determined to be header print data.

In a printing apparatus in which the printing position and the paper cutter position are separated, the header print data is generally printed while the leading end of the receipt is being transported to the paper cutter position and the trailing end of the receipt is then cut, thereby shortening the white space at the leading end of the receipt.

When this type of printing apparatus receives transaction information print data generated by a POS application, additional information print data appended to the transaction information print data, and header print data, and the printing apparatus receives print data while execution of the paper cut command added to the transaction information print data is delayed (while the command is saved), the printing apparatus determines whether the received print data is additional information print data or header print data based on whether an identifier is contained in the received print data. If the received print data is recognized as header print data, the paper is cut after printing the header print data. As a result, receipt paper waste can be eliminated while the receipt can still be cut at an appropriate position (between the header print data and either the additional information print data or transaction information print data).

Furthermore, because the printing apparatus controls operation based on the received print data, a function for printing header print data, for example, can be added to the host computer side by adding a print utility and without needing to modify the POS application.

Furthermore, when the additional information print data is generated by analyzing the content of the transaction information print data, additional information print data may or may not be sent to the printing apparatus after the transaction information print data depending upon the content of the transaction information. Even when additional information print data is not sent (such as when the header print data for the next receipt is received while the paper cut command is saved (delayed)), however, the receipt can be cut at an appropriate position (between the transaction information print data and header print data).

If the paper cut command is not delayed (saved) and the identifier is not contained in the received print data (such as when additional information print data is received after the header print data), the received print data is printed without executing the paper cut command. This arrangement enables consecutively printing the transaction information print data and additional information print data even when the additional information print data is sent before the transaction information print data.

Yet further, if a paper cut command has not been saved (delayed) and print data not containing the identifier is received, the paper is still preferably cut after printing the print data even though a paper cut command was not added to the print data. This arrangement thus affords receiving and printing print data other than the transaction information print data, additional information print data, and header print data, and enables cutting the paper after printing print data that does not contain an identifier.

This printing apparatus preferably also has a third control unit for controlling the transportation unit and printing unit to print the additional information print data when the received print data is determined to be additional information print data, then continuing to delay execution of the paper cut command while waiting to receive the header print data.

This printing apparatus can thus cut the receipt at an appropriate position even when multiple units of additional information print data such as for printing advertising and printing product coupons are successively sent to the printing apparatus. A variety of different print data can thus be printed and cut at appropriate positions without modifying the POS application.

The present invention can thus provide a printing apparatus that can efficiently print data containing transaction information print data and additional information print data, and can issue a receipt cut at an appropriate position determined by the print data, without changing the firmware for controlling the printing apparatus.

The transaction information print data generated by the POS application preferably contains a unique transaction number that is different for each transaction process, and the additional information print data output unit extracts the transaction number from the transaction information print data and adds this transaction number to the additional information print data as the identifier.

By thus extracting the transaction number from the transaction information print data and using this transaction number as the identifier, this aspect of the invention does not need to specifically generate the identifier to be added to the additional information print data.

Furthermore, by using the transaction number as the identifier, the printing apparatus can determine to which transaction information print data the received additional information print data is to be added based on the identifier detected from the transaction information print data and the identifier detected from the additional information print data. Processing errors can thus be avoided by means of this evaluation.

Other advantages and attainments together with a fuller understanding of the invention will become apparent and appreciated by referring to the following description and claims taken in conjunction with the accompanying drawings.

DESCRIPTION OF THE PREFERRED EMBODIMENTS

A printing apparatus, POS system, and a printing apparatus control method according to the present invention are described next below with reference to the accompanying figures.

When a printing apparatus according to the present invention receives transaction information print data generated by the POS application for printing a receipt to print paper, the printing apparatus stores the paper cut command contained in the print data. The printing apparatus then detects an identifier in the print data received after the paper cut command is stored to determine the timing for executing the stored paper cut command, and can thus cut the receipt at an appropriate position along the print paper. New functions can thus be added with minimal capital investment and without changing the POS application by thus enabling the printing apparatus to execute various control operations according to the received print data.

Figure 5:
FIG. 5 shows a sample receipt cut off from an endless roll of print paper at the trailing end of a printed receipt and shows the leading edge of the cut roll paper with a header printed thereon prior to the printing of the next receipt.

The invention is thus described below using by way of example a POS system used in a supermarket, fast food store, or other retail business where the POS system has a mechanism for printing header print data, transaction information print data, and additional information print data on a receipt 61. As shown in FIG. 5, the header print data typically includes the store name, address, telephone number, and graphics. The additional information relates to advertising or sales promotions.

Figure 1:
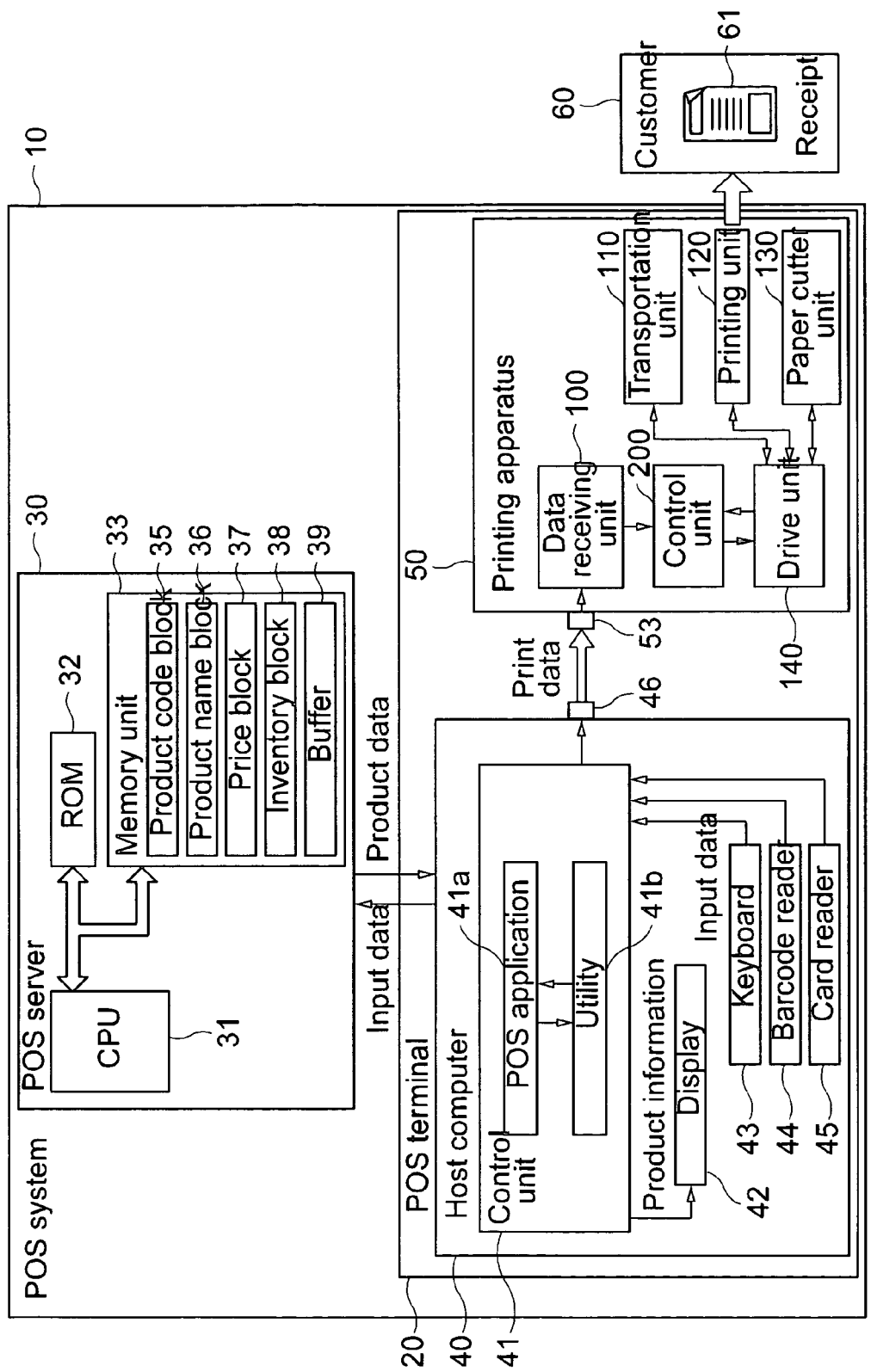
FIG. 1 is a schematic diagram showing a POS system according to a preferred embodiment of the present invention.

As shown in FIG. 1 a POS system 10 according to this embodiment of the invention is composed of one or more POS terminals 20 (only one shown in FIG. 1) and a POS server 30 connected over a network to each of the POS terminals 20 for centrally managing input data entered to each POS terminal 20. The operator (user) of the POS terminal 20 scans the barcode from each purchased product using the barcode reader 44, and the POS terminal 20 sends the captured barcode data to the POS server 30.

The POS server 30 has a CPU 31, ROM 32, and a working memory unit 33, and processes data stored in the buffer 39 of the memory unit 33 according to a control program stored in ROM 32.

The memory unit 33 stores the product master, which is a database containing a record of each product and product code 35, product name 36, price 37, and inventory 38 fields. Based on input data (barcode data) received from the POS terminal 20, the CPU 31 extracts and sends information relating to the product code, name, and price for each product from the product master to the POS terminal 20. Based on the data received from the POS server 30, the POS terminal 20 generates product data for printing to a receipt 61 and for displaying product information on the display 42 of the POS terminal 20.

This product data is the data from which the transaction information print data (see FIG. 5) is generated by the host computer 40, and contains the product name, price, and other product information printed on the receipt 61.

The POS terminal 20 has a host computer 40 and printing apparatus 50 (receipt printer) interconnected through connectors 46 and 53. The host computer 40 runs a transaction process for generating the transaction information print data printed on a receipt 61 and saving the input data to the POS server 30 based on the product data acquired from the POS server 30. The printing apparatus 50 prints the print data to print paper to generate a receipt 61 which is then cut from the print paper before or after printing header print data on the next receipt 61.

The host computer 40 gets the input data from the products by reading barcodes with a barcode reader 44 or manually entering data using the keyboard 43. Credit card information for credit card transactions and customer information such as a membership number can also be acquired by scanning a customer credit card or member card using a card reader 45. If authorization is required such as to use a credit card, the credit card information is sent to the authorization server (not shown in the figure) used by the credit card company to determine if the transaction can be processed.

The host computer 40 also has a display 42 for presenting the product information generated from the product data received from the POS server 30 so that the customer 60 can also view the product and price information.

The host computer 40 also has a control unit 41 composed of a POS application 41*a* running under the DOS, and a utility 41*b* can be loaded for adding or changing functions as required. Therefore, by adding a utility 41*b* enabling additionally printing header print data to a POS application 41*a* having a function for printing the transaction information print data and corresponding additional information print data, this embodiment of the invention affords an arrangement whereby these three print data blocks can be printed. However, simply adding this utility 41*b* does not by itself enable the printing apparatus 50 alone to run an appropriate printing process (receipt cutting process), and the printing apparatus 50 therefore runs a process for evaluating the received print data and controlling operation accordingly as described in further detail below.

The POS application 41*a* generates print data including the transaction information print data for printing to a receipt 61 based on information such as the product data and price information retrieved from the POS server 30. In order to print the transaction information print data on the printing apparatus 50 according to the command system of the printing apparatus 50, print commands are generated in addition to the transaction information print data, and a paper cut command for cutting the trailing end of the printed receipt 61 is added to the transaction information print data. The print commands, transaction information print data, and paper cut command are then sent to the printing apparatus 50.

The POS application 41a also analyzes the transaction information print data and generates the additional information print data based on the result of this analysis. More specifically, the POS application 41a determines if the product data (product codes and product names) and the transaction total contained in the transaction information print data meet specific predefined conditions for generating additional information print data.

For example, if the condition for issuing a coupon for rice is that "rice" is contained in the product data to be printed, additional information print data for printing a coupon for rice is generated only if "rice" is one of the products purchased by the customer. A print sample of a receipt 61 is shown in FIG. 5. The POS application 41a therefore does not necessarily produce additional information print data for every transaction process, but when the additional information print data is generated the POS application 41a adds an identifier to the additional information print data before sending the data to the printing apparatus 50. This identifier uniquely identifies the print data to which it has been added as additional information print data thereby allowing the additional information print data to be distinguished from all other kinds of print data that might be sent to the printing apparatus.

As described above, the utility 41b is a program for generating header print data including the store name, address, telephone number, and graphics, for example, and is programmed to send the header print data to the printing apparatus 50 after sending the additional information print data.

As shown in FIG. 5 the header print data is printed at the top of a receipt 61 before the transaction information print data for such receipt 61 is generated. This embodiment of the invention thus improves the efficiency of the receipt printing process by sending the header print data after sending the additional information print data for the previous receipt 61. In this way the header of the next receipt can thus be printed before the transaction information print data for said next receipt is received and even before the previous receipt is cut. If the additional information print data is not generated and printed, the header print data is sent to the printing apparatus 50 when status data indicating that the additional information will not be printed (that is, the result of analyzing the product data) is received from the POS application 41a.

The header print data stored by the utility 41b shall not be limited to one type, and multiple different headers can be stored and used according to the time of day or day of the week, for example.

The printing apparatus 50 in this embodiment is a receipt printer composed of a data receiving unit 100 for receiving control commands and print data from the host computer 40, a transportation unit 110, a printing unit 120, a paper cutter unit 130, a drive unit 140 for driving the printing unit 120 and paper cutter unit 130, and a control unit 200 for controlling the operation of the printing apparatus 50. This printing apparatus 50 is described more fully below with reference to FIG. 3.

Figure 2:
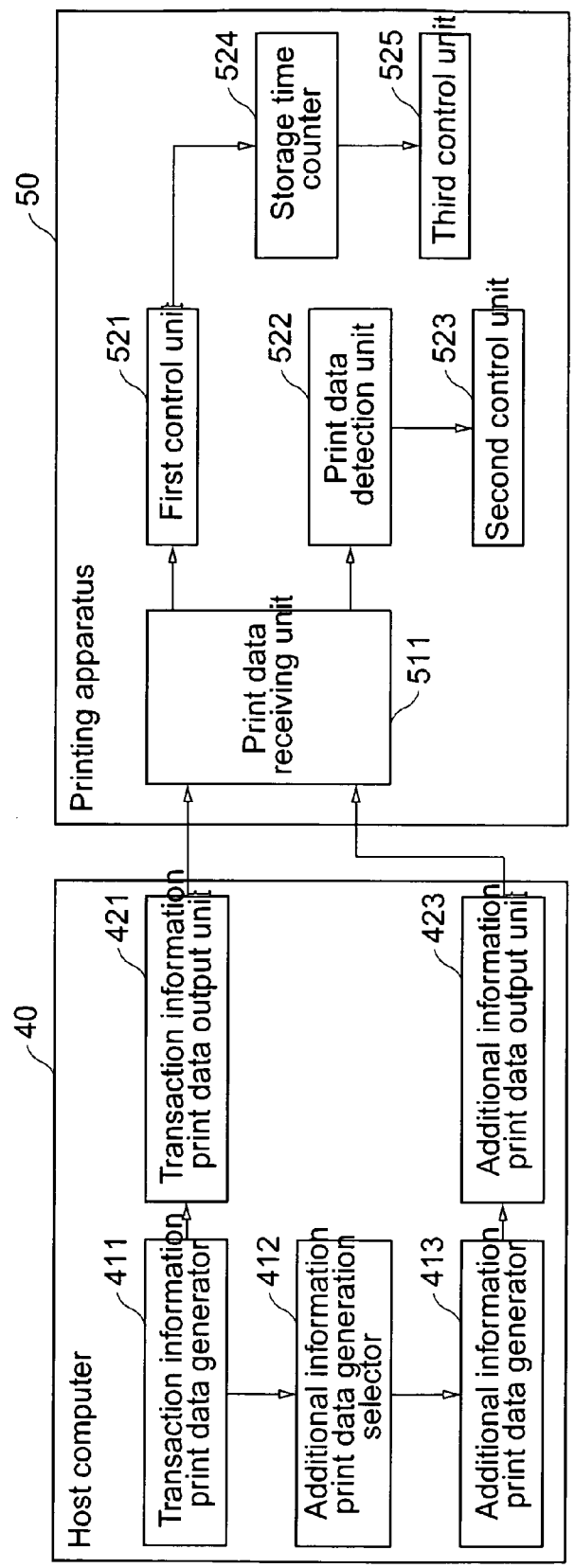
FIG. 2 is a function block diagram of the host computer and printing apparatus.

The control arrangement of the host computer 40 and printing apparatus 50 is described next with reference to the functional block diagram in FIG. 2. As shown in FIG. 2 the host computer 40 has a transaction information print data generator 411, transaction information print data output unit 421, additional information print data generation selector 412, additional information print data generator 413, and additional information print data output unit 423.

The transaction information print data generator 411 produces transaction information print data with a paper cut command. The transaction information print data output unit 421 sends the transaction information print data and paper cut command produced by the transaction information print data generator 411 to the printing apparatus 50. The additional information print data generation selector 412 determines whether or not to generate additional information print data based on the result of analyzing the transaction information print data. The additional information print data generator 413 then generates the additional information print data if the additional information print data generation selector 412 decides that additional information print data is to be generated. The additional information print data output unit 423 adds an identifier identifying the additional information print data supplied from the additional information print data generator 413 and outputs the additional information print data and identifier to the printing apparatus 50.

The main part of these elements of the host computer 40 are rendered by the POS application 41a. Though not particularly shown in the figures, the host computer 40 also has a header print data generator for producing the header print data, and a header print data output unit for sending the header print data produced by the header print data generator to the printing apparatus 50. The utility 41b provides the main part of the header print data generator and header print data output unit.

The transaction information print data generator 411 generates a different transaction number for each transaction process (each receipt) and adds the transaction number as an identifier to the transaction information print data generated based on the input data.

Based on the transaction information print data, the additional information print data generation selector 412 references an additional information table to determine whether or not to generate additional information print data. This additional information table contains the generating conditions (such as product codes and total amount information) and the additional information print data to be printed if the adding conditions are met. More specifically, if a product code or total amount information contained in the transaction information print data meets the generating conditions (that is, a product code is found in the additional information table, or the purchase total is within the specific price range (or exceeds a specific amount) defined in the additional information table), the additional information print data generation selector 412 determines that additional information print data is to be generated. If the product codes and the total amount do not meet the adding conditions, the additional information print data generation selector 412 determines that the additional information print data is not to be generated.

If the additional information print data is to be generated, the additional information print data generator 413 extracts all additional information print data relating to the amount total and the product codes contained in the transaction information print data, and generates the additional information print data by merging (arranging) the extracted additional information print data in the order extracted or according to a specific format defined in the additional information print data generator 413.

The additional information print data output unit 423 extracts the transaction number added to the transaction information print data for which the additional information print data is generated, and adds this transaction number as an identifier to the additional information print data.

If the additional information print data generation selector 412 decides to not produce the additional information print data, the additional information print data generation selector 412 sends corresponding status data to the utility 41b.

As also shown in FIG. 2, the printing apparatus 50 has a print data receiving unit 511, first control unit 521, print data detection unit 522, second control unit 523, storage time counter 524, and third control unit 525. The print data receiving unit 511 receives print data from the host computer 40, and the first control unit 521 takes control when the print data receiving unit 511 receives transaction information print data. The print data detection unit 522 determines if print data received while a paper cut command is stored for execution (that is, is delayed) is additional information print data. The second control unit 523 controls printing the print data and executing the paper cut command based on the detection result from the print data detection unit 522. The storage time counter 524 measures how long a paper cut command is stored by the first control unit 521. The third control unit 525 unconditionally executes the paper cut command when the time measured by the storage time counter 524 exceeds a specified limit.

The print data receiving unit 511 part of the printing apparatus 50 is composed primarily of the data receiving unit 100 and the other parts are composed primarily of the control unit 200. (See FIG. 1.)

When transaction information print data is received, the first control unit 521 controls printing the transaction information print data and saves the paper cut command added to the transaction information print data. The paper cut command is saved by setting a paper cut command flag triggered by recognizing (detecting) the paper cut command appended to the end of the transaction information print data. The storage time counter 524 thus measures how long the paper cut command has been saved by checking the status of this paper cut command flag, i.e. the duration is measured during which the paper cut command flag remains set.

If the paper cut command flag is set (that is, the paper cut command is saved), while print data is received the print data detection unit 522 determines if the received print data is additional information print data by reading the print data to detect if the identifier, which is a transaction number as noted above in this embodiment, was added to the received print data.

In addition to detecting if a transaction number is present in the received print data, the print data detection unit 522 can also determine if the detected transaction number is the same as the transaction number detected in the previously received transaction information print data (that is, the transaction information print data that triggered saving the paper cut command), and report an error to the host computer 40 and on the display (not shown in the figure) of the printing apparatus 50 if the transaction numbers do not match. This enables determining if the additional information print data that should be added to the transaction information print data is wrong, and can thus reduce processing errors.

If the print data detection unit 522 determines that the print data is additional information print data, the second control unit 523 executes the paper cut command after the additional information print data is printed. If the print data is not the additional information print data, the paper cut command is executed before printing the received print data. Upon execution of the paper cut command the paper cut command flag is reset.

If the storage time counter 524 determines that the paper cut command has been saved for longer than a specified time, the third control unit 525 unconditionally executes the paper cut command and thus cancels the saved paper cut command. More specifically, the third control unit 525 resets the paper cut command flag.

Figure 3:
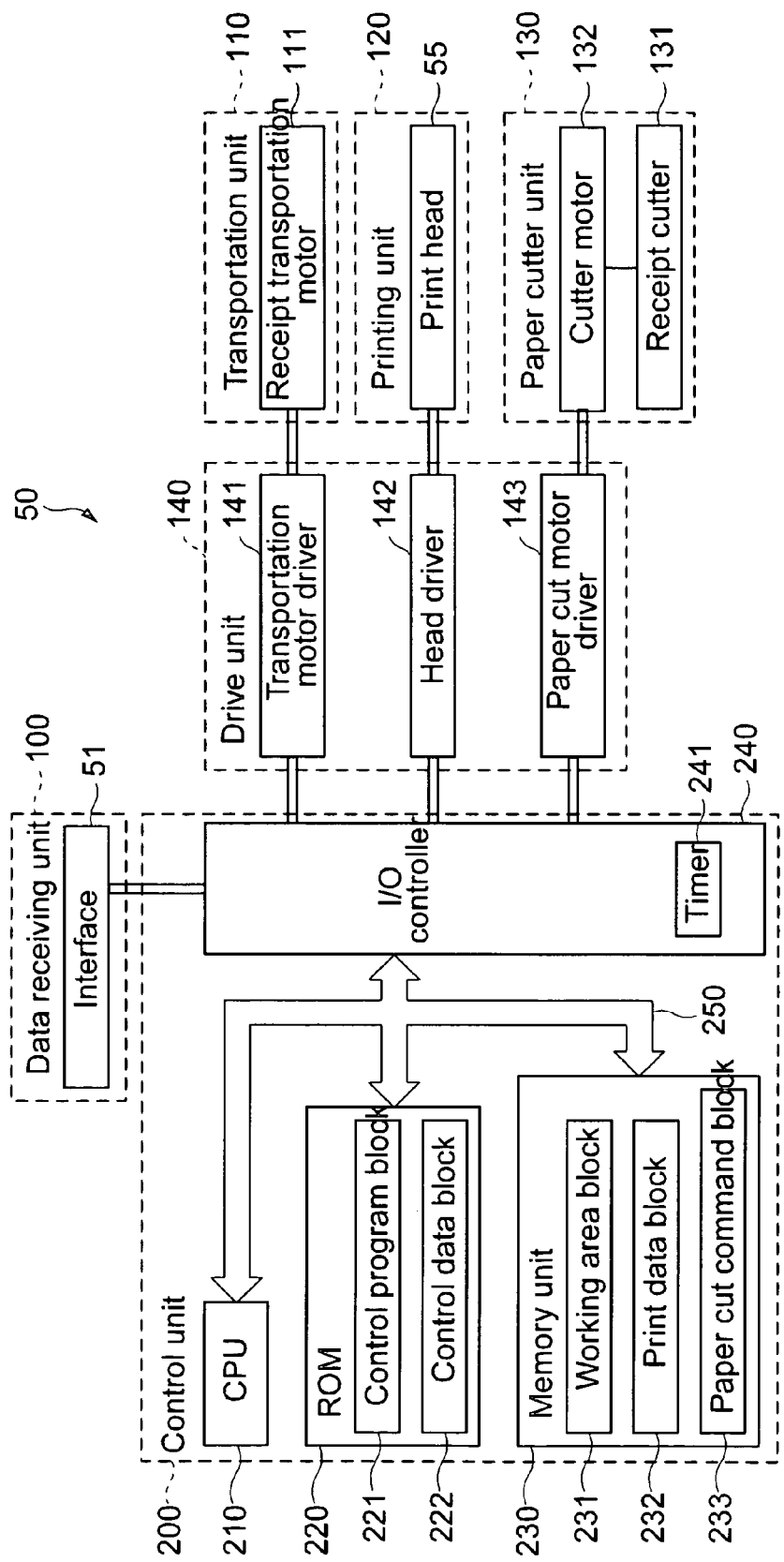
FIG. 3 is a control block diagram of the printing apparatus.

The control arrangement of the printing apparatus 50 is further described below with reference to the control block diagram in FIG. 3. As shown in FIG. 3 the printing apparatus 50 has a data receiving unit 100, a transportation unit 110, a printing unit 120, a paper cutter unit 130, a drive unit 140, and a control unit 200 connected to these other parts for controlling overall printing apparatus 50 operation.

The data receiving unit 100 has an interface 51 for communicating data with the host computer 40. The transportation unit 110 has a receipt transportation motor 111 and conveys the receipt 61 for printing and to the desired location for cutting the receipt 61. The printing unit 120 has a print head 55 for printing data to the receipt 61 synchronized to transportation of the receipt 61. The paper cutter unit 130 has a receipt cutter 131 and cutter motor 132 for driving the receipt cutter 131 to cut the receipt 61. The drive unit 140 has a transportation motor driver 141, head driver 142, and paper cutter motor driver 143 for driving the transportation motor, print head, and paper cutter respectively.

The control unit 200 has a CPU 210, ROM 220, memory unit 230, and input/output control unit (I/O controller) 240 interconnected over an internal bus 250.

ROM 220 has a control program block 221 for storing a control program run by the CPU 210 to control operation according to the received print data, and a control data block 222 for storing control data such as data relating to the specific time the paper cut command is stored and character data for printing text. The character data could be stored in a dedicated character data ROM instead of in ROM 220.

The memory unit 230 is used as working memory when running the control process, and includes a working area block 231 for storing flags such as the paper cut command flag, a print data block 232 (receive buffer) for temporarily storing the print data received from the data receiving unit 100, and a paper cut command block 233 for temporarily storing (saving) the paper cut command added to the transaction information print data. The memory unit 230 is also constantly backed up so that the stored data is not lost if the power fails, or the data is stored to a non-volatile storage device such as flash ROM.

The I/O controller 240 also includes logic circuits composed of gate arrays and custom IC devices for complementing the functions of the CPU 210 and handling interface signals for communication with peripheral circuits. The I/O controller 240 also has a timer 241 for measuring how long the paper cut command is saved. The I/O controller 240 thus passes print data received from the host computer 40 to the internal bus 250 either directly or after processing the data, and works in conjunction with the CPU 210 to output data and control signals output from the CPU 210 through the internal bus 250 to the drive unit 140 either directly or after processing the data.

Thus comprised, the CPU 210 receives signals and data from the data receiving unit 100 via the I/O controller 240 by running a control program stored in ROM 220. The CPU 210 also processes data in memory unit 230 based on the received signals and data, and controls printing (including cutting the receipt 61) by outputting signals and data through the I/O controller 240 to the drive unit 140.

Figure 4:
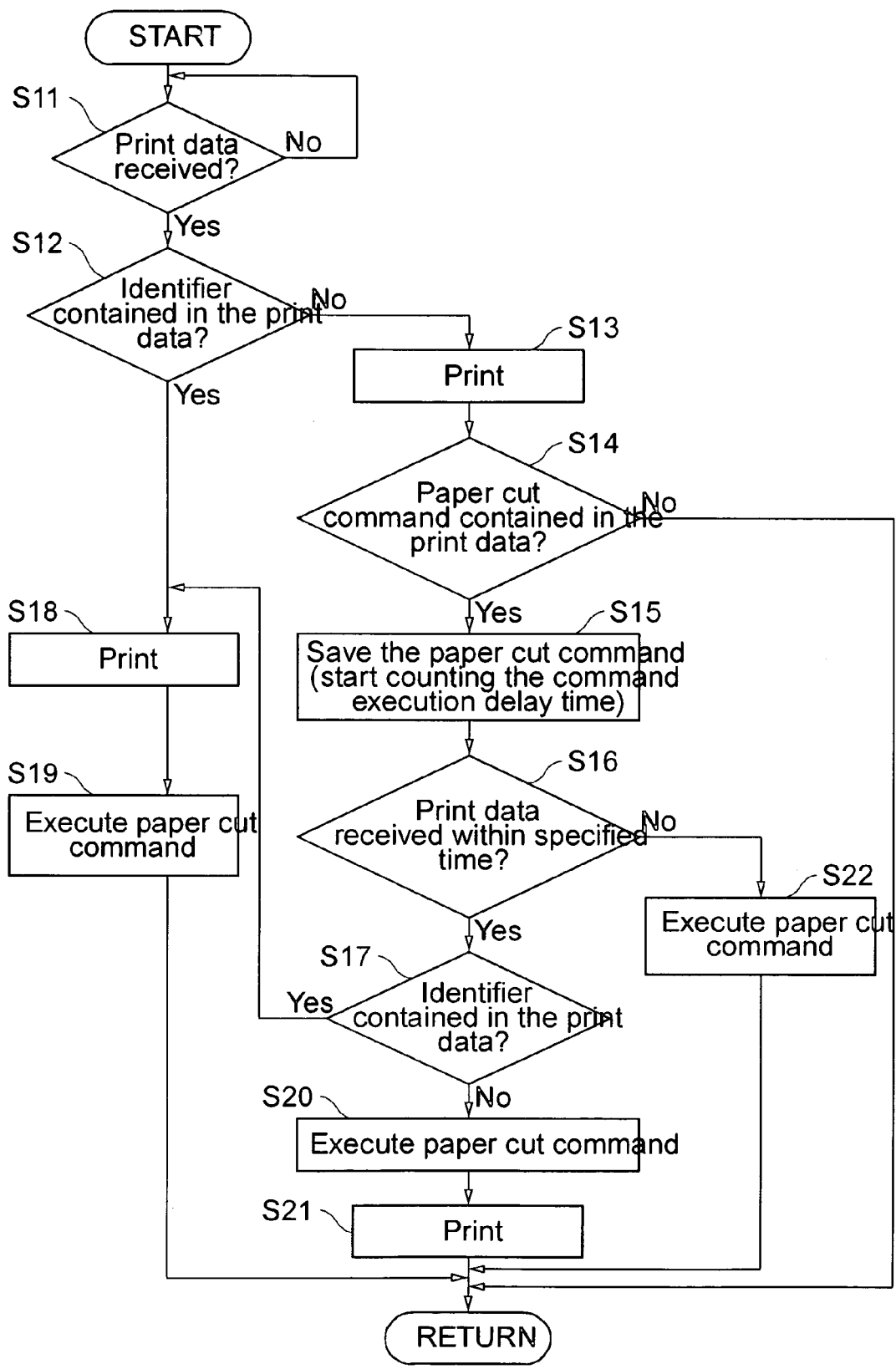
FIG. 4 is a flow chart of the printer control process run by the printing apparatus.

How the CPU 210 control printing by the printing apparatus 50 is described next with reference to the flow chart in FIG. 4. For brevity, this embodiment of the invention is described below as receiving and printing transaction information print data, additional information print data (such as coupon data), and header print data (such as a top logo), and receiving and printing other types of print data is not addressed.

When the printing apparatus 50 (CPU 210) receives print data from the host computer 40 (S11 returns yes), the printing apparatus 50 determines if the identifier (transaction number) is contained in the print data (S12). If the identifier is not contained in the print data (S12 returns no), the transportation unit 110 and printing unit 120 are driven to print the print data (transaction information print data or header print data) (S13), and whether a paper cut command is appended to the print data (whether the print data is transaction information print data) is determined (S14).

If a paper cut command is not appended (the received print data is the header print data) (S14 returns no), the printing apparatus 50 waits to receive the next print data (control returns to S11). If a paper cut command is detected (transaction information print data was received) (S14 returns yes), the paper cut command flag is set and the paper cut command is thus saved (stored to paper cut command block 233), and the timer 241 in the I/O controller 240 starts counting the time (S15). If next print data is received within the predefined time (the specified maximum storage time set in the control data block 222) (S16 returns yes), whether an identifier was added to the print data (that is, whether additional information print data was received) is determined (S17).

If the identifier is found in the received print data (additional information print data was received) (S17 returns yes), the print data is printed (S18) and the paper cut command is then executed (the paper is cut by the paper cutter unit 130, S19). After the paper cut command is executed, the paper cut command flag is also cleared (the paper cut command is cleared).

A sample of a receipt 61 printed to print paper and cut in accordance with the foregoing process is shown in FIG. 5. As shown in FIG. 5 the receipt 61 starts with the header print data (top logo) printed at the top of the receipt 61 (corresponding to the leading end thereof), followed by the transaction information print data and additional information print data (coupon data), and is then cut at the trailing end following the additional information print data (the paper cut position). A dotted line is printed at the boundary between the transaction information print data and the additional information print data in this embodiment of the invention.

The additional information print data is not necessarily sent from the host computer 40, and there are situations in which the next print data is not received after transaction information print data is received when the application does not print header print data (such as, it is time when only the transaction information print data and additional information print data are sent from the host computer 40, but when the additional information print data is not sent). Therefore, if next print data is not received within the specified time in step S16 (S16 returns no), the paper cut command is automatically executed after the specified time passes (S22). In this situation the receipt 61 is issued without the additional information print data and header print data shown in FIG. 5 (that is, the receipt is cut after the transaction information print data is printed).

If next print data is received in the specified time (S16 returns yes) but the identifier is not contained in the received print data (S17 returns no), the paper cut command is executed (S20) and the print data is then printed (S21). In this situation the receipt 61 is issued without the additional information print data shown in the sample in FIG. 5, and the header print data is printed for the next receipt 61. Thus printing the header print data that is printed before the transaction information print data at the leading end of the next receipt before the transaction information print data for the next receipt is received improves the efficiency of the receipt printing process.

If a paper cut command is not saved but the identifier was added to the received print data (which occurs when the additional information print data is received at any time other than immediately after the transaction information print data) (S12 returns yes), the print data is printed (S18) and the paper cut command is then executed (S19). Therefore, when multiple units of additional information print data are sent added consecutively to the transaction information print data, the receipt 61 is issued with a cut following each of the second and subsequent units of additional information print data.

Whether the printing apparatus 50 receives transaction information print data generated by the POS application 41*a*, additional information print data appended to the transaction information print data, or other print data, a printing apparatus 50 according to this embodiment of the invention determines whether print data that is received when a paper cut command extracted from the transaction information print data is saved is the additional information print data, that is, whether the received print data is print data to be printed on the same receipt 61 as the transaction information print data, based on the presence or absence of an identifier in the received print data. If the print data is not the additional information print data, the paper is cut before printing the received print data and the receipt 61 can thus be cut at an appropriate position.

Furthermore, because printer operation is controlled by the printing apparatus 50 itself based on the received print data, a function for printing data other than the transaction information print data and additional information print data can be added to the host computer 40 by simply adding an appropriate utility 41*b*, and additional functionality can thus be added to the host computer 40 without changing the POS application 41*a*.

Furthermore, when additional information print data is generated based on analysis of the transaction information print data, the additional information print data may or may not be sent to the printing apparatus 50 after the transaction information print data depending upon the content of the transaction. However, because the paper is cut before printing the received print data even when additional information print data is not sent to the printing apparatus (such as when the next transaction information print data is received while the paper cut command is saved), a receipt 61 containing only the transaction information can be issued.

As also described above the paper cut command is unconditionally executed when a specified time has passed after the paper cut command added to the transaction information print data is saved. The trailing end of the receipt 61 can thus be automatically cut when the print data sent from the host computer 40 normally contains only the transaction information print data and the additional information print data (including situations when the header print data is simply not printed) and additional information print data is not sent for printing due to the content of the transaction information print data.

In other words, executing the paper cut command need not be delayed until the next transaction information print data is received as a result of the additional information print data or header print data not being sent after the transaction information print data is received.

The foregoing embodiment of the invention is described as receiving transaction information print data, additional information print data, or header print data, and using an identifier added to the received data to identify the additional information print data. The data to which the identifier is added shall not, however, be limited to the additional information print data, that is, the data generated based on an analysis of the transaction information print data. More specifically, the data received by the printing apparatus 50 could include print data containing an identifier other than the transaction information print data, additional information print data, and header print data. Steps S12 and S17 therefore simply evaluate the received print data based on the presence or absence of an identifier, and do not specifically determine if the received data is coupon data or other additional information print data.

A second embodiment of the present invention is described below with reference to FIG. 6 to FIG. 9.

Figure 6:
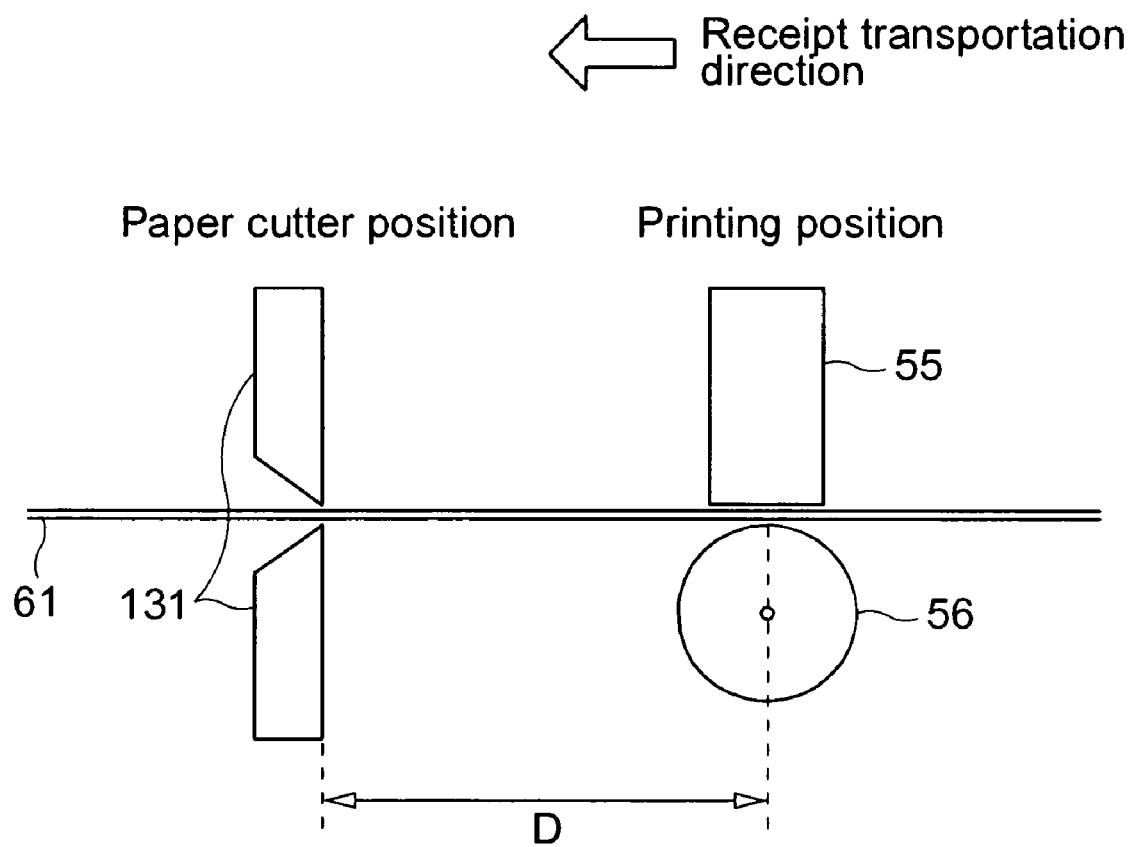
FIG. 6 shows the relationship between printing position and the paper cutter position in a printing apparatus according to a second embodiment of the invention.

As shown in FIG. 6 this embodiment of the invention is based on a printing apparatus 50 in which the printing position and paper cutting position are separated. The problem solved by this embodiment of the invention is controlling printing while reducing the white space at the leading end of the receipt in this type of printing apparatus 50. Primarily the differences between this embodiment and the foregoing embodiment are described below.

Figures 7A, 7B:
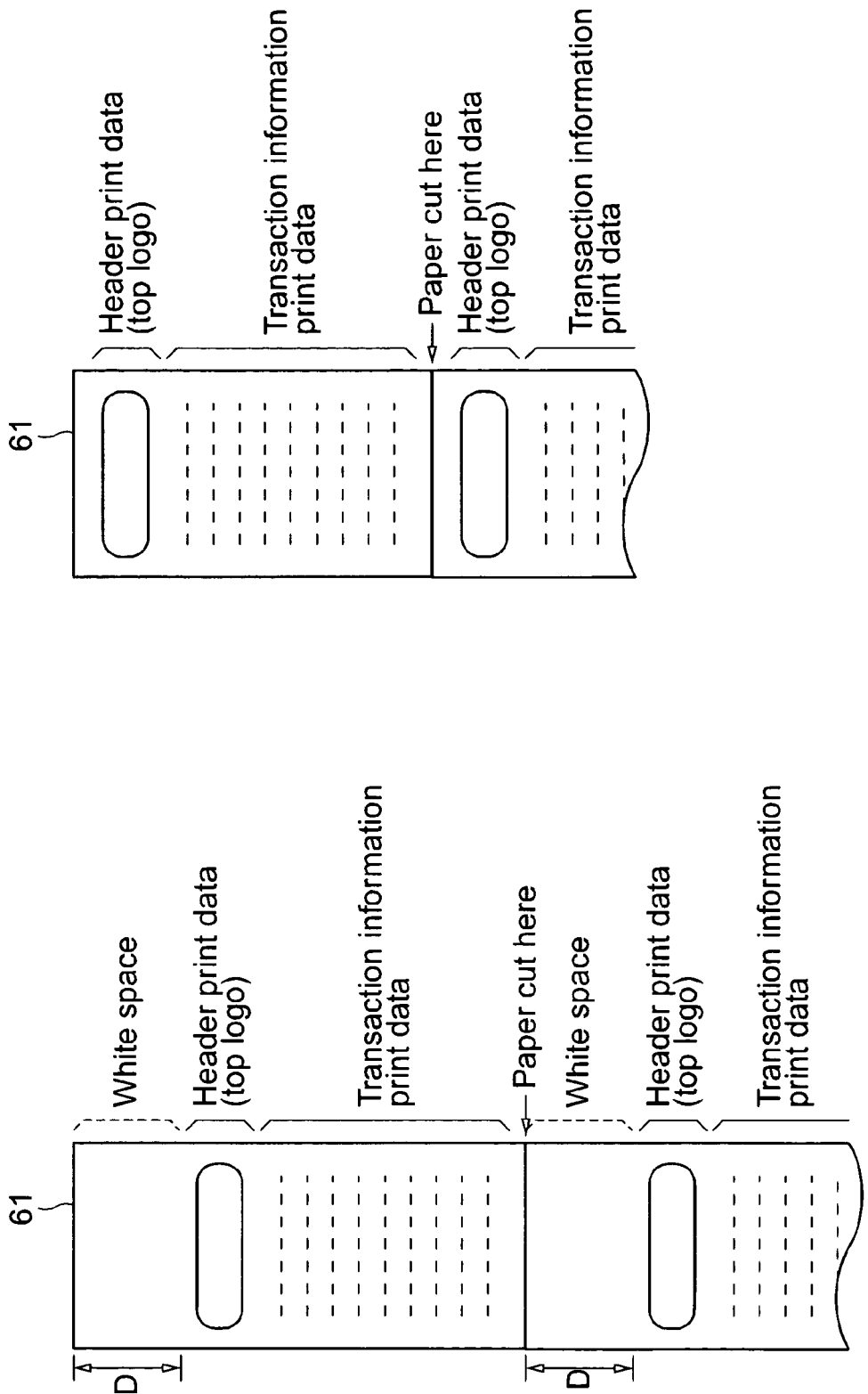
FIG. 7 shows a sample receipt printed by this second embodiment.

As shown in FIG. 6 the printing position at which the print head 55 and platen 56 are disposed is on the upstream side in the receipt transportation direction, of the paper cutter position at which the receipt cutter 131 is disposed. The distance between both positions is identified as D. If the receipt is cut immediately after printing the transaction information print data, and the receipt will be cut somewhere within the print out of the transaction information print data. The paper must therefore be fed distance D after printing the transaction information print data ends before cutting the receipt if the receipt is to be cut after the end of the printed transaction information print data. However, if the header print data is printed after feeding the receipt this distance D, white space of length D is necessarily left at the leading end of the receipt as shown in FIG. 7A.

This embodiment of the invention solves this problem by printing the header print data for the next receipt 61 while transporting the leading end of the next receipt by the distance D to the paper cutter position, and then cutting at the trailing end of the receipt 61 just printed. This eliminates the foregoing white space as shown in FIG. 7B, and thus eliminates wasted receipt 61 paper.

Printer control for cutting the trailing end of the receipt 61 after thus printing the header print data on the next consecutive receipt 61 is described next below. Note that the length of the header print data in the paper transportation direction is shorter than the distance D between the printing position and the paper cutter position (referred to below as the head-cutter distance D).

Figure 8:
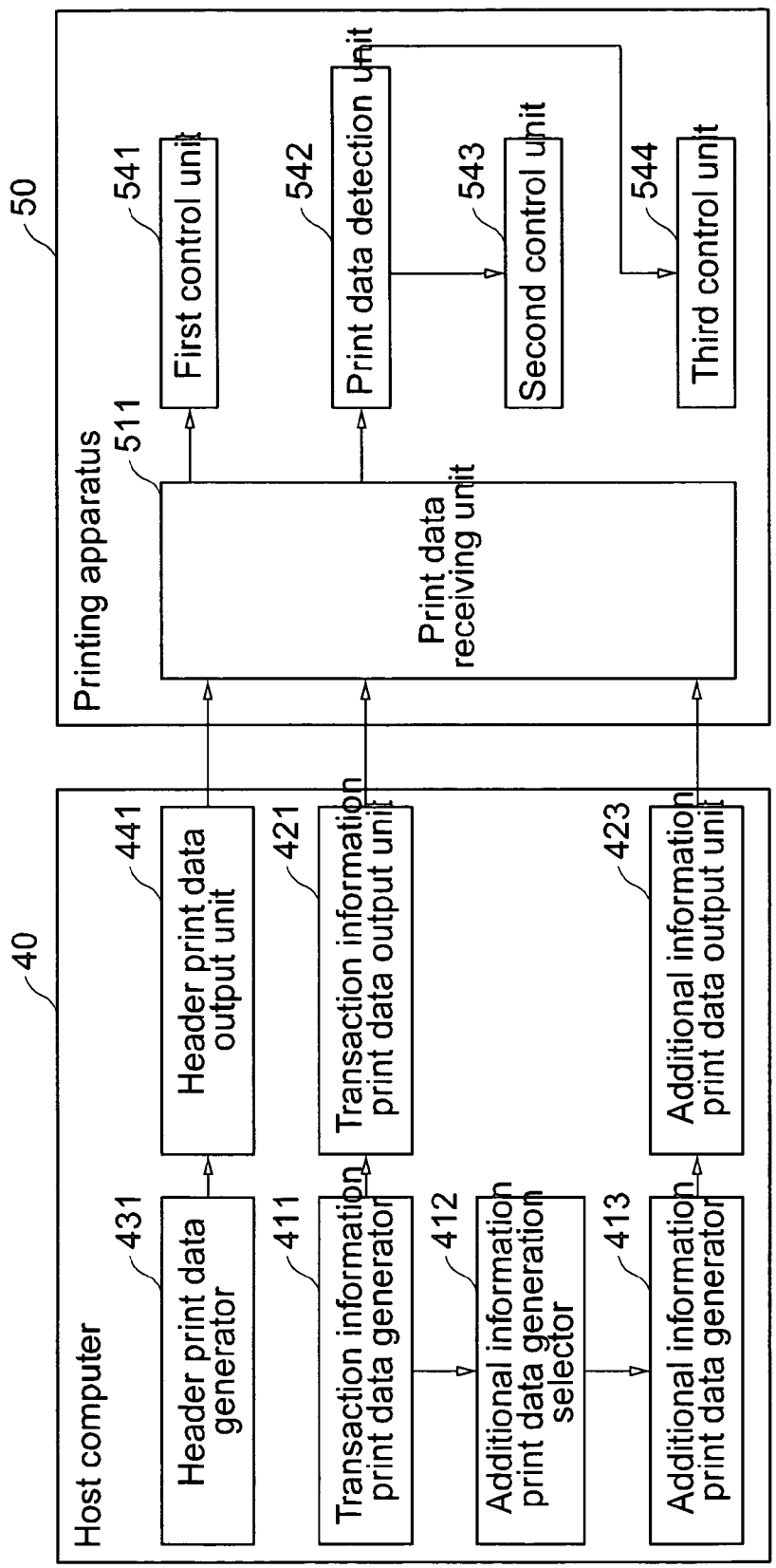
FIG. 8 is a function block diagram of the host computer and printing apparatus in a second embodiment of the invention.

FIG. 8 is a function block diagram describing the control arrangement of the host computer 40 and printing apparatus 50 in this embodiment of the invention. As shown in the figure the host computer 40 has a transaction information print data generator 411, transaction information print data output unit 421, additional information print data generation selector 412, additional information print data generator 413, additional information print data output unit 423, header print data generator 431, and header print data output unit 441.

The header print data generator 431 produces the header print data for printing the receipt header. The header print data output unit 441 outputs the resulting header print data to the printing apparatus 50.

If the content of the header print data does not change on different receipts, that is, if only one type of header print data is used, the header print data generator 431 simply reads and passes the header print data from a storage medium (not shown in the figure) in the host computer 40 to the header print data output unit 441. However, if all or part of the content of the header print data changes according to the time of day, day of the week, or operator setting or the header print data is selected from among a plurality of headers, the header print data generator 431 produces and passes the header print data accordingly to the header print data output unit 441.

The header print data output unit 441 then simply passes the header print data received from the header print data generator 431 directly to the printing apparatus 50 without adding an identifier.

The header print data generator 431 and header print data output unit 441 can be rendered primarily by the POS application 41a or utility 41b. In addition, the transaction information print data generator 411, transaction information print data output unit 421, additional information print data generation selector 412, additional information print data generator 413, and additional information print data output unit 423 have the same function as in the foregoing first embodiment, and further description thereof is thus omitted here.

The printing apparatus 50 has a print data receiving unit 511, first control unit 541, print data detection unit 542, second control unit 543, and third control unit 544.

The first control unit 541 handles control when the print data receiving unit 511 receives transaction information print data.

The print data detection unit 542 determines the data type when print data is received while executing the paper cut command is delayed.

The second control unit 543 handles control when the print data received by the print data detection unit 542 is identified as header print data.

The third control unit 544 handles control when the received print data is identified as additional information print data.

The print data receiving unit 511 part of the printing apparatus 50 is rendered primarily by the data receiving unit 100, and the other parts of the printing apparatus 50 are rendered primarily by the control unit 200, as shown in FIG. 3.

When transaction information print data is received, the first control unit 541 prints the transaction information print data and saves the paper cut command added to the transaction information print data (that is, sets the paper cut command flag). There is no limit to how long the paper cut command is saved in this embodiment of the invention.

The print data detection unit 542 determines whether print data received while execution of the paper cut command is delayed is additional information print data or header print data based on whether an identifier (for example, the transaction number) is present. The received print data is thus known to be additional information print data if the identifier is detected in the print data, and to be header print data if the identifier is not detected.

If the received print data is header print data, the second control unit 543 executes the paper cut command after printing the header print data.

If the received print data is additional information print data, the third control unit 544 prints the additional information print data and continues saving the paper cut command. The paper cut command is thus not executed until the header print data is received, and execution waits until the header print data is received.

Figure 9:
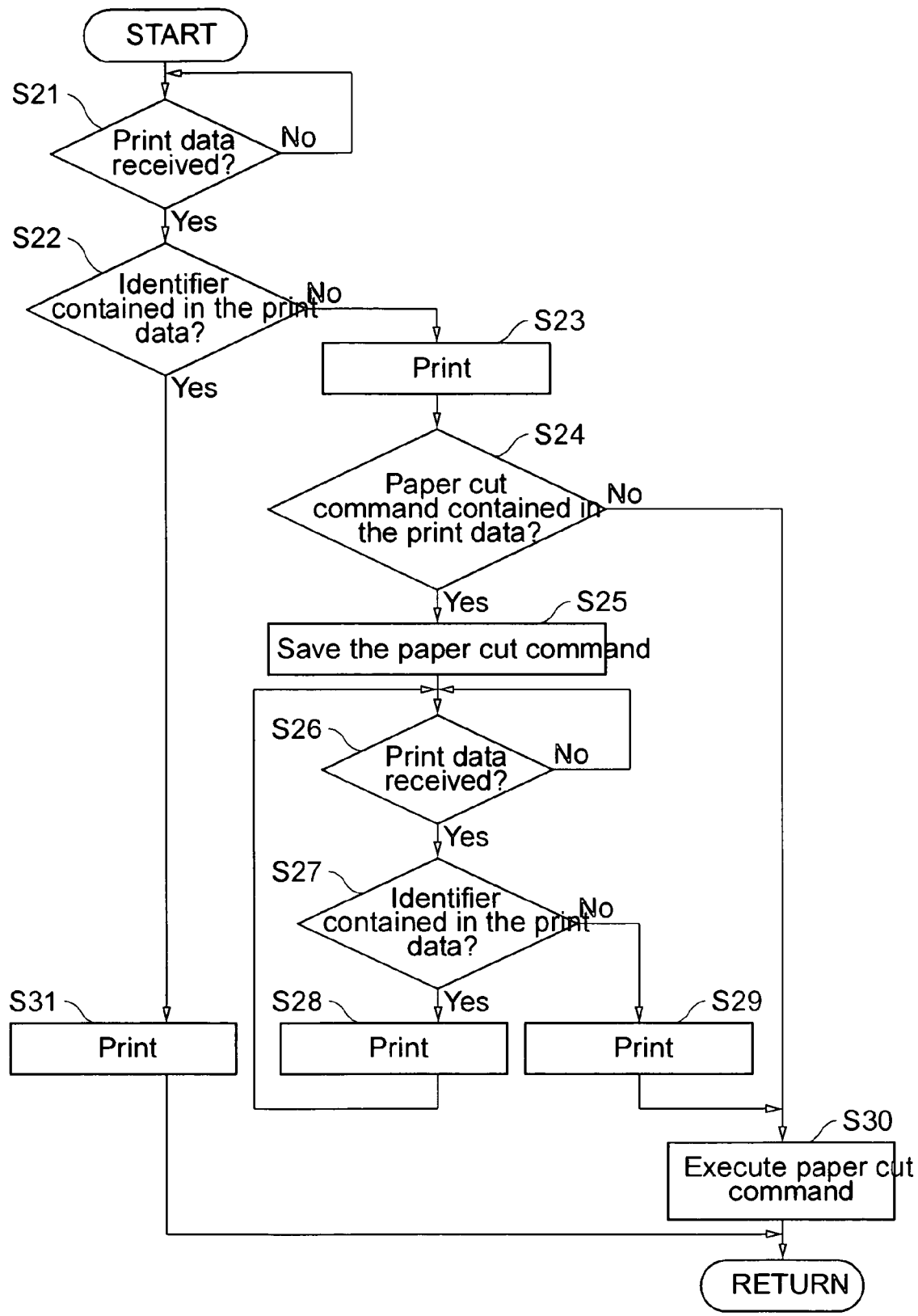
FIG. 9 is a flow chart of the printer control process run by the printing apparatus in a second embodiment of the invention.

Printing control in a printing apparatus 50 according to this embodiment of the invention is described below with reference to the flow chart in FIG. 9. For brevity, this embodiment of the invention is described below as receiving and printing transaction information print data, additional information print data (such as coupon data), and header print data (such as a top logo), and receiving and printing other types of print data is not addressed.

When the printing apparatus 50 receives print data from the host computer 40 (S21 returns yes), the printing apparatus 50 determines if the identifier (transaction number) is contained in the print data (S22). If the identifier is not contained in the print data (S22 returns no), the printing apparatus 50 prints the print data (transaction information print data or header print data) (S23), and determines whether a paper cut command is appended to the print data (whether the print data is transaction information print data) (S24).

If a paper cut command is detected (transaction information print data was received) (S24 returns yes), the paper cut command flag is set and the paper cut command is thus saved (S25). The printing apparatus 50 then waits to receive the next print data (S26), and determines if the print data contains the identifier (that is, if additional information print data was received) when print data is received (S27).

If the identifier is found in the received print data (additional information print data was received) (S27 returns yes), the print data is printed (S28) and the printing apparatus 50 waits to receive next print data (S26). The paper cut command flag is thus not cleared (saving the paper cut command is not stopped) when additional information print data is received while the paper cut command flag is set.

On the other hand, if the print data received while the paper cut command flag is set does not contain the identifier (that is, header print data was received) (S27 returns no), the print data is printed (S29), the paper cut command is executed, and the paper cut command flag is cleared (S30).

When the transaction information print data, additional information print data, and header print data are thus received in this order the paper is cut between the additional information print data and header print data and the header print data is printed for the next receipt 61 (see FIG. 5).

Furthermore, if additional information print data is not received, the paper is cut between the transaction information print data and header print data, and the header print data is printed for the next receipt 61 (but transaction information print data for the next receipt 61 is not printed) (see FIG. 7B).

If the received print data does not contain the identifier and the paper cut command is not appended to the print data received when the paper cut command flag is set (that is, header print data was received) (S24 returns no), the paper cut command is executed (S30). Receiving only the header print data when the paper cut command flag is thus not set could occur immediately after printing apparatus 50 power turns on or when only the header print data is printed, for example. When data other than the transaction information print data, additional information print data, and header print data is received, the paper cut process (S30) is also executed after printing the data not containing an identifier (S23).

If the paper cut command flag is not set and the identifier is contained in the received print data (such as when additional information print data is received after the header print data) (S22 returns yes), the print data is simply printed (S31) and the printing apparatus 50 waits to receive the next print data (S21). A receipt 61 on which the transaction information print data and additional information print data are printed contiguously can thus be issued even when the additional information print data is sent before the transaction information print data.

While a paper cut command added to the transaction information print data is saved, this embodiment of the invention determines whether the received print data is additional information print data or header print data based on the presence of an identifier, and the paper is cut after printing the header print data if the received print data is header print data. The receipt 61 can thus be cut at a desirable position (between the additional information print data or transaction information print data and the header print data) while eliminating receipt paper waste even in a printing apparatus 50 in which the head-cutter distance D is short.

Furthermore, by controlling operation on the printing apparatus 50 side according to the type of print data received, a function for printing header print data, for example, can be added by adding a utility, for example, on the host computer 40 side without modifying the POS application 41a.

Yet further, when the additional information print data is produced based on analysis of the transaction information print data, additional information print data may or may not be sent to the printing apparatus after transaction information print data depending upon the content of the transaction information. However, even when the additional information print data is not sent (such as when header print data for the next receipt 61 is received while the paper cut command flag is set), the receipt 61 can be cut at a desirable position between the transaction information print data and header print data.

Multiple units of additional information print data can thus be printed because the receipt paper is cut at an appropriate position (that is, between the last additional information print data and the following header print data, and not between the transaction information print data and additional information print data or between continuous blocks of additional information print data) even when multiple units of additional information print data are sent to the printing apparatus 50, such as when additional information print data for advertising and for coupons is sent. A wider variety of print data can thus be printed without changing the POS application 41a.

Figure 10:
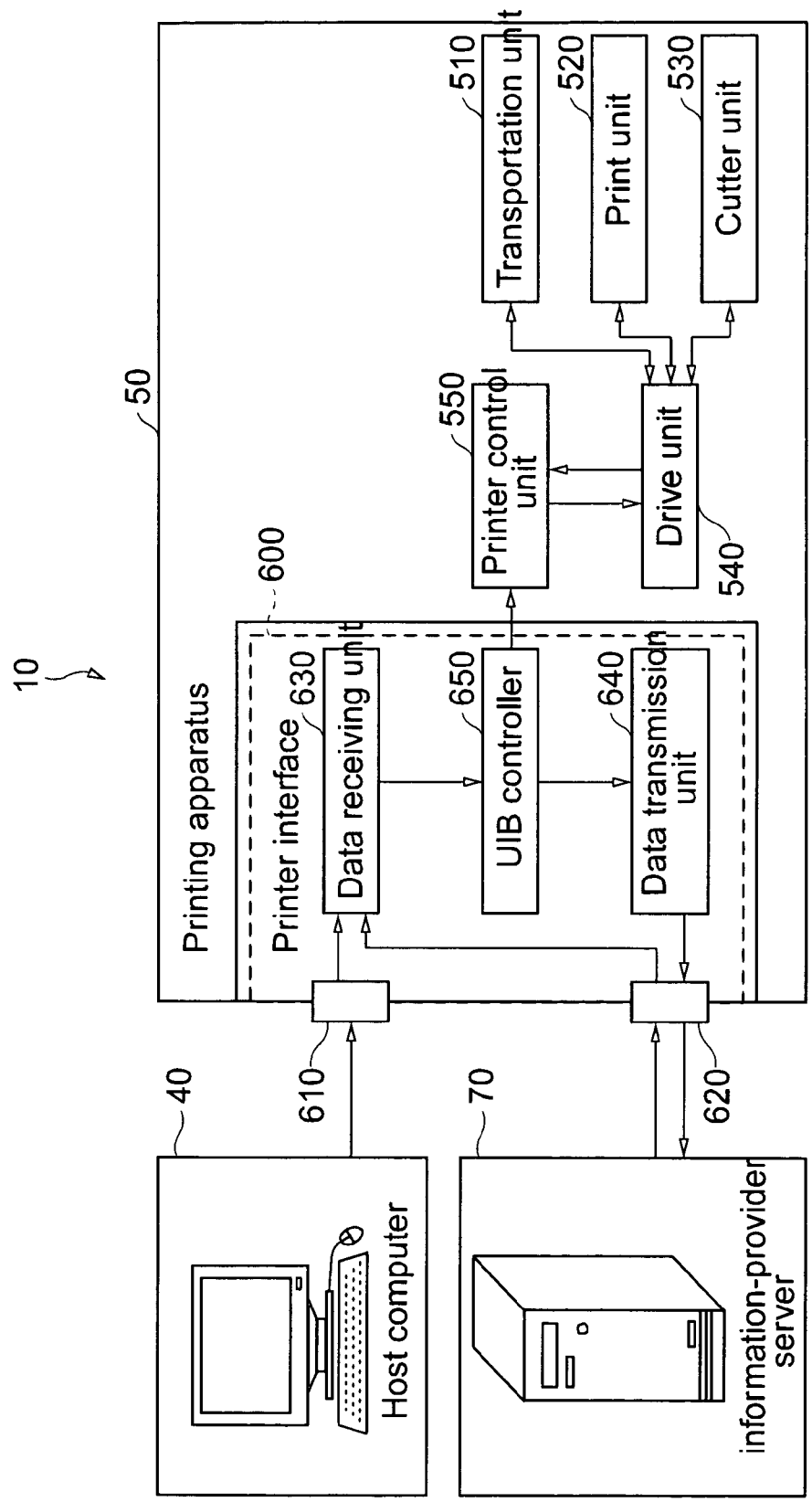
FIG. 10 is a schematic diagram showing a POS system according to a third embodiment of the present invention.

A third embodiment of the present invention is described next with reference to FIG. 10.

The host computer 40 sends transaction information print data and additional information print data to the printing apparatus 50 in the foregoing embodiments. This embodiment of the invention, however, adds an information-provider server 70 for generating and providing this additional information print data, and thus differs from the preceding embodiments in that the transaction information print data is sent from the host computer 40 and the additional information print data is sent from the information-provider server 70 to the printing apparatus 50.

In addition, a printer interface 600 (Universal Interface Board: UIB) having two ports 610 and 620 for connecting to the host computer 40 and information-provider server 70 is also removable installed to the printing apparatus 50, and the printing apparatus 50 thus acquires the print data through this printer interface 600.

For brevity only the differences between this embodiment and the configuration of the first embodiment (shown in FIG. 1) are described below.

When the host computer 40 sends transaction information print data to the printing apparatus 50 in a POS system 10 according to this embodiment of the invention, the data receiving unit 630 in the printer interface 600 receives the print data through the first port 610 and passes the data through the UIB controller 650 to the printer control unit 550, and the data transmission unit 640 sends the transaction information print data through the second port 620 to the information-provider server 70. The transaction information print data passed to the printer control unit 550 is then printed by the transportation unit 510 and print unit 520 by way of the drive unit 540. The receipt is then cut by the cutter unit 530 based on the paper cut command added to the transaction information print data.

The transaction information print data sent to the information-provider server 70 is interpreted by the information-provider server 70. More specifically, the information-provider server 70 determines based on the acquired transaction information print data whether to generate additional information print data, and then generates or does not generate additional information print data accordingly.

When additional information print data is generated, the information-provider server 70 also adds an identifier (transaction number) before sending the data to the printing apparatus 50 (printer interface 600). The data receiving unit 630 of the printer interface 600 receives the additional information print data through the second port 620 and passes the data through the UIB controller 650 to the printer control unit 550 for printing.

Note that the parts of the printing apparatus 50 shown in FIG. 2 are achieved by means of the UIB controller 650 in this embodiment of the invention.

By incorporating an information-provider server 70 as described above, this embodiment of the invention enables adding additional information print data with minimal capital investment and without changing an existing host computer 40 (including the POS application 41a) that does not already have a function for printing such additional information print data.

Furthermore, by applying the arrangement of the first embodiment and the second embodiment to the arrangement of this embodiment, print data containing transaction information print data and additional information print data can be efficiently printed even when new functionality is added, and a receipt 61 that is cut at an appropriate position determined by the print data can be issued.

Furthermore, because the printer interface 600 of the printing apparatus 50 determines if the identifier is contained in the received print data and controls the timing at which the paper cut command is executed, new functions can be added to the printing apparatus 50 without modifying the printer firmware.

As described in the first to third embodiments above, printer operation is controlled based on the received print data in a printing apparatus 50 according to the present invention, and new functionality (such as printing print data other than transaction information print data and additional information print data) can be added on the host computer 40 side by adding a utility 41b to the host computer 40. Changing the POS application 41a is therefore not necessary.

Furthermore, because the additional information print data is generated as a result of interpreting the transaction information print data, additional information print data is not always sent to the printing apparatus 50 following the transaction information print data. The receipt 61 can still be cut at an appropriate position even when the additional information print data is not sent to the printing apparatus 50, however, because the timing when the paper cut command is processed is varied according to the presence of an identifier.

The timing for executing the paper cut command is changed according to the presence of an identifier in the foregoing embodiments of the invention, but the timing could alternatively be changed according to the type of identifier. That is, the host computer 40 (or information-provider server 70) could add a different identifier to additional information print data and header print data, and the printing apparatus 50 could read the identifier to determine the type of print data.

The printing apparatus 50 described above typically uses a thermal print head, but the print head could be an inkjet head, wire dot print head, or other type of printing device.

The mechanical (functional) portions of the host computer 40 and printing apparatus 50 can also be realized as a computer-readable program. This program can also be provided stored to a recording medium so that the program can be used on other computers. Examples of such a recording medium include hard disk drives, flash ROM, memory cards (such as Compact Flash (R), Smart media, and memory sticks), Compact Disc (R), magneto-optical disc, DVD media, and floppy disks.

The present invention shall not be limited to a POS system 10 as described above, and can be applied to a cash register or stand-alone electronic cash register not connected to a POS server 30. The arrangement of the system and individual components can also be varied in many ways without departing from the scope of the invention as described in the accompanying claims. Such changes and modifications are to be understood as included within the scope of the present invention as defined by the appended claims, unless they depart therefrom.

What is claimed is:

1. A printing apparatus for printing a receipt to a recording medium such as paper in response to print data received from a computer including first print data representing transaction information having a paper cut command appended thereto and second print data representing additional information print data to be printed in addition to the first print data having a predetermined identifier added thereto, comprising:
    a receiving unit for receiving print data from said computer;
    a transportation unit for conveying said recording medium on which the receipt is to be printed;
    a printing unit for printing the receipt synchronized to the operation of said transportation unit;
    a cutter unit for cutting the printed receipt from the recording medium in response to said paper cut command contained in said first print data;
    a first control unit for analyzing the print data received in said receiving unit to determine if the print data is first print data and for delaying the timing in the execution of the paper cut command when the print data is determined to be said first print data with said first control unit having a delay time counter for timing the delay of the paper cut command when the print data is determined to be said first print data;
    a detection unit responsive to the delay in the execution of the paper cut command to determine if the print data received in said receiving unit while execution of the paper cut command is being delayed is second print data containing said predetermined identifier; and
    a second control unit for controlling the printing unit and the cutter unit in response to the output of said detection unit to cause the paper cut command to be executed after printing the second print data provided the received print data is determined to be second print data containing said predetermined identifier and for causing the paper cut command to be executed before printing the received print data when the received print data does not contain said predetermined identifier.

2. A printing apparatus as described in claim 1, further comprising:
    a third control unit for canceling the delay and executing the paper cut command when the delay time from the delay time counter exceeds a specified time.

3. A printing apparatus for printing a multiplicity of receipts in succession with each receipt printed to print paper in response to print data received from a computer with said print data including first print data representing transaction information which may include a paper cut command, second print data representing additional information print data to be printed in addition to the first print data and having an identifier added thereto, and third print data representing a receipt header to be printed on each successive receipt, said printing apparatus comprising:

a receiving unit for receiving print data from said computer;
  a transportation unit for conveying the print paper to which each receipt is printed;
  a printing unit for printing the receipt synchronized to said transportation unit;
  a cutter unit for cutting a printed receipt in response to a paper cut command appended to the first print data;
  a first control unit for controlling the operation of the transportation unit and printing unit to delay the timing in the execution of the paper cut command for a controlled time period when the received print data in said receiving unit is determined to be first print data with said first control unit having a delay time counter for timing the delay of the paper cut command when the print data is determined to be said first print data;
  a print data evaluation unit responsive to the delay in the execution of the paper cut command for determining if print data received in said receiving unit while execution of the paper cut command is being delayed is second print data or third print data; and
  a second control unit responsive to said print data evaluation unit for controlling the transportation unit, printing unit, and cutter unit for timing the printing f third print data to said print paper in the preparation of each successive receipt such that printing occurs before executing the paper cut command to cut the previous receipt when the received print data is determined to be third print data.

4. A printing apparatus as described in claim 3, further comprising:

a third control unit for controlling the transportation unit and printing unit to print the second print data when the received print data is determined to be second print data, and for continuing to delay execution of the paper cut command until receipt of the third print data for printing of the next subsequent receipt.

5. A POS system having a host computer for running a POS application and a printing apparatus for printing a receipt to print paper in response to print data generated from the host computer wherein said print data includes first print data representing transaction information having a paper cut command appended thereto when generated by the POS application and second print data representing additional information print data to be printed in addition to the first print data and having an identifier added thereto, said POS system comprising:

a first print data output unit for sending said first print data to the printing apparatus with said added paper cut command when generated;
  a second print data generation unit for analyzing the first print data and determining whether to generate second print data based on the analysis of the first print data;
  a print data output unit responsive to the determination by said second print data generation unit that second print data is to be generated for generating and outputting to the printing apparatus the second print data along with the identifier added thereto and
  a control unit responsive to said second print data generation unit and to said print data output unit for controlling execution of the paper cut command such that if the first print data does not include the identifier the paper cut command is executed before printing the first print data and if second print data is determined to be generated along with the identifier the paper cut command is executed after printing the second print data.

6. A POS system having a host computer for running a POS application and having a printing apparatus for printing a receipt to print paper in response to print data generated from the host computer wherein said print data includes first print data representing transaction information which may include a paper cut command, second print data representing additional information print data to be printed in addition to the first print data and having an identifier added thereto, and third print data representing a receipt header to be printed on each successive receipt to be printed by the printing apparatus comprising a third print data output unit for sending the third print data to the printing apparatus;
  a first print data output unit for sending first print data to the printing apparatus with an added paper cut command when generated by the POS application;
  a second print data generating unit for determining whether to generate second print data based on analyzing the transaction information print data;
  a second print data output unit for generating and outputting the second print data with the identifier added thereto to the printing apparatus when the second print data generating unit determines that second print data is to be generated and
  a control unit responsive to said second print data generation unit and to said print data output unit for controlling execution of the paper cut command such that if the first print data does not include the identifier the paper cut command is executed before printing the first print data and if second print data is determined to be generated alone with the identifier the paper cut command is executed after printing the second print data.

7. A POS system as described in claim 5 wherein the first print data generated by the POS application contains a transaction number that is different in each transaction process; and the second print data output unit extracts the transaction number from the first print data and adds this transaction number to the second print data as the identifier.

8. A POS system as described in claim 6, wherein the first print data generated by the POS application contains a transaction number that is different in each transaction process; and the second print data output unit extracts the transaction number from the first print data and adds this transaction number to the second print data as the identifier.

9. A method for controlling a printing apparatus for printing a receipt to print paper and cutting the receipt in response to print data received from a computer including first print data representing transaction information having a paper cut command appended thereto and second print data representing additional information print data to be printed in addition to the first print data and having a predetermined identifier added thereto, comprising the steps of:

determining when first print data is received from the computer for printing the first print data to said receipt while and delaying the timing of the execution of the paper cut command;

determining if print data received while execution of the paper cut command is being delayed is second print data containing said predetermined identifier;

executing the paper cut command after printing the second data when the received print data is determined to be second print data containing said predetermined identifier; and executing the paper cut command before printing the received print data when the received print data is determined not to be second print data.

10. A method for controlling a printing apparatus for printing a multiplicity of consecutive receipts on print paper and cutting the trailing end of each printed receipt from the print paper in succession in response to print data received from a computer with said print data including first print data representing transaction information which may include a paper cut command, second print data representing additional information print data to be printed in addition to the first print data and contains a predetermined identifier added thereto, and third print data representing a receipt header to be printed on each consecutive receipt comprising the steps of:

printing the first print data to a receipt and delaying execution of the paper cut command added to the first print data when first print data is received from the computer;

determining if print data received while execution of the paper cut command is being delayed is third print data or second print data based on whether the predetermined identifier is detected in the received print data; and printing the third print data on the next consecutive receipt before executing the paper cut command to cut the previous printed receipt when the received print data is determined to be third print data.

* * * * *